United States Patent Office 3,523,106
Patented Aug. 4, 1970

3,523,106
METHYLENEBIS(CYCLOHEXYL ISOCYANATE) HAVING INCREASED REACTIVITY
Raymond B. Davison, Fairport, N.Y., assignor to Allied Chemical Corporation, New York, N.Y., a corporation of New York
No Drawing. Filed Apr. 11, 1968, Ser. No. 720,477
Int. Cl. C08g 22/18
U.S. Cl. 260—77.5                                       9 Claims

ABSTRACT OF THE DISCLOSURE

The reactivity of methylenebis(cyclohexyl isocyanate) with polyols is increased by increasing the acidity of the isocyanate with HCl or an acid chloride.

---

Organic isocyanates are produced in considerable quantities for use in the preparation of polyurethane coatings, films, fibers, foams and the like. The preparation of polyurethanes is well known and generally involves the reaction of a polyisocyanate with a polyol, such as a polyester or polyether, commonly with the aid of a catalyst such as an organometallic compound.

The rapid reaction rate of many isocyanates, especially the aromatic isocyanates has led to the practice of lowering the reaction rate by the addition of an inhibitor or stabilizer. It is known that the addition of a small amount of HCl or an acid chloride to highly reactive isocyanates, such as toluene diisocyanate, will effectively decrease their reactivity with polyols, especially in organometal-catalyzed reactions. See for example Saunders et al., Polyurethanes, Chemistry and Technology, Part I, Interscience Publishers, N.Y. pages 213–215.

In the case of methylenebis(cyclohexyl isocyanate), hereinafter referred to as $H_{12}MDI$, which has a very slow reaction rate with polyols, especially when in a highly pure state, the addition of HCl or an acid chloride has not heretofore been considered desirable, since it would be expected to lower still further an already inconviently low reaction rate. In the reaction of polyols with $H_{12}MDI$, it is common practice to improve the reactivity through the use of an organometal catalyst. The use of an organometal catalyst, however, tends to increase sensitivity to moisture and leads to undesirable side reactions. In the case of isocyanate-terminated prepolymers the presence of organometal catalyst tends to reduce their stability as a result of a slow decrease in free isocyanate content during storage. However, without the use of such catalysts, the reaction proceeds at an impractically slow rate.

It is, therefore, an object of the present invention to provide an improved method for increasing the reactivity of $H_{12}MDI$ with polyols. It is a further object of this invention to provide $H_{12}MDI$ having increased reactivity with polyols.

It has now been found that, in the case of $H_{12}MDI$, its reactivity toward polyols can actually be substantially increased by increasing its acidity to about 0.004 to 1.0 percent by weight preferably about 0.005 to about 0.5 percent.

The increase in reactivity obtained in accordance with the present invention is particularly surprising in view of the retardation effect frequently noted in the literature with respect to other isocyanates.

Various acid chlorides, such as aroyl chlorides (e.g. benzoyl chloride), succinyl chloride, acetyl chloride, fumaryl chloride and phthalyl chloride, as well as HCl can be employed in the practice of the present invention. (For simplicity, these compounds will hereinafter be referred to as "chlorides.") From the standpoint of economy, availability and effectiveness, HCl and benzoyl chloride are preferred.

The chloride is preferably added to the isocyanate. However, it is possible to determine the amount of chloride necessary to provide the desired acidity and add it to the polyol with which the isocyanate is to be reacted, or to the urethane reaction mixture.

In accordance with a preferred mode of carrying out the process of the present invention, $H_{12}MDI$, prepared by phosgenation of the corresponding diamine or diamine salt, is distilled to remove color forming impurities. The distillation is generally carried out so that a "lights" (monoisocyanate) cut is first removed and the diisocyanate distilling at about 180° C. at 2–3 mm. is recovered. (It will be recognized that higher and lower temperatures can be used with correspondingly higher and lower pressures.) To the thus treated isocyanate, having a minimum strength of at least 95%, preferably 98.5%, as determined by dibutyl amine titration for NCO, is added sufficient benzoyl chloride or HCl to produce to desired acidity.

For purposes of this invention, acidity is determined using ASTM D1638–61T with the following modifications:

(1) Instead of 10 ml. toluene diisocyanate, 6 g. of methylenebis(cyclohexyl isocyanate) are used.

(2) Instead of 100 ml. n-propanol, 200 ml. are used.

(3) Instead of being stirred for 10 minutes, the mixture of isocyanate and n-propanol is stirred for 2–3 minutes at 60° C.

(4) Instead of 0.1 N KOH, 0.01 N KOH is used.

(5) The percent acidity is calculated using the weight of methylenebis(cyclohexyl isocyanate) as the denominator.

Various polyols which may be reacted with methylenebis(cyclohexyl isocyanate) in the preparation of polyurethane coatings, films, fibers, foams and the like, include both polyesters and polyethers and mixtures thereof. Most commonly, polyols having molecular weights between about 100 and 3500 are employed. In the preparation of isocyanate terminated polymers or prepolymers which may be subsequently cured by reaction with water or chain-extended by reaction with a difunctional active hydrogen containing compound such as a diamine, the isocyanate is employed in a proportion sufficient to provide an excess of isocyanate groups. For such purposes isocyanate-polyol mixtures wherein the NCO/OH ratio is between about 1.5 and 3.5 are commonly employed. Typical polyethers include, for example, polyethylene glycol, polypropylene glycol, polytetramethylene ether glycol and the like. Typical polyesters include, for example, those prepared by reaction of a carboxylic acid such as adipic, succinic, sebacic, phthalic terephthalic, hexahydroterephthalic etc. or esters or acid halides with a glycol such as polyethylene glycol. Natural polyesters such as linseed oil, soya oil, and caster oil can also be employed.

To further illustrate the present invention and the manner in which it may be practiced, the following examples are set forth. In the examples, unless otherwise indicated, all temperatures are in centigrade degrees and all parts and percentages are by weight.

EXAMPLE 1

A portion of methylenebis(cyclohexylisocyanate) was purified by degassing and distillation under vacuum at conditions which progressed from a vapor temperature of 25 degrees and a pressure of 3.25 mm. Hg to a vapor temperature of 148 degrees and a pressure of 0.15 mm. Hg. The purified $H_{12}MDI$ which had an acidity of .003 percent was divided into two portions. One portion (175 parts) was treated by the addition of 0.139 parts of benzoyl chloride to provide an acidity of 0.028 percent. The other, untreated portion was retained as a control. Polyol-isocyanate reaction mixtures having NCO/OH ratios of 1.5 were prepared from each portion by mixing 69 grams of isocyanate with 181 grams of a commercially available diol having a molecular weight of 1040 and a hydroxyl number of 110. Each reaction mixture was divided into 50 gram portions and placed in separate test tubes (25×100 mm.). The test tubes were capped with plastic caps and placed in a temperature-controlled oil bath at 120 degrees. After periods of 60, 90, 120 and 150 minutes, the test tubes were withdrawn from the oil bath and cooled quickly in an ice bath to stop the reaction. After 5 minutes each test tube was removed from the ice bath and heated at 25 degrees for 25 minutes. The relative viscosity of the liquid reaction products was then determined by inverting each test tube and determining the time required for the liquid to pour from one end to the other in the inverted test tubes. The degree of reaction is indicated by the relative viscosity, i.e., pour time, since the more viscous the reaction product the greater the extent of the reaction. Thus by comparing samples held in the oil bath for equal times, an indication of relative reactivity of the samples is obtained. The data thus obtained is as follows:

|  | Pour Time (seconds) | |
| --- | --- | --- |
|  | Control Sample | Acidified Sample |
| Reaction Time:[1] |  |  |
| 60 | 1.0 | 208 |
| 90 | 1.0 | 398 |
| 120 | 1.0 | 512 |
| 150 | 1.0 | 561 |

[1] Minutes held at 120 degrees.

EXAMPLE 2

The procedure of Example 1 was repeated except that in place of the benzoyl chloride, there was substituted .0350 grams of anhydrous HCl and the acidity of the acidified sample was 0.021 percent. The data obtained is as follows:

|  | Pour Time (Seconds) | |
| --- | --- | --- |
|  | Control sample | Acidified sample |
| Reaction Time:[1] |  |  |
| 60 | 1.0 | 255 |
| 90 | 1.0 | 441 |
| 120 | 1.0 | 520 |
| 150 | 1.0 | 578 |

[1] Minutes at 120 degrees.

EXAMPLES 3–11

The procedure of Example 1 was repeated except that a reaction time of 90 minutes at 120 degrees was employed and the amount of benzoyl chloride added was varied as shown:

| Example: | Amount of benzoyl chloride per 100 grams of isocyanate | Percent acidity | Pour time (seconds) |
| --- | --- | --- | --- |
| 3 | 0 | 0.0017 | 1 |
| 4 | 0.024 | .005 | 50 |
| 5 | 0.04 | .008 | 84 |
| 6 | 0.08 | .018 | 335 |
| 7 | 0.15 | .036 | 562 |
| 8 | 0.29 | .071 | 752 |
| 9 | 0.58 | .141 | 1,156 |
| 10 | 1.16 | .287 | 1,779 |
| 11 | 2.32 | .577 | 2,345 |

I claim:
1. A composition of matter comprising 4,4'-methylenebis(cyclohexyl isocyanate) and an acid chloride, said acid chloride being present in sufficient amount to provide an acidity of 0.004 to 1.0%, by weight of said isocyanate.
2. The composition of claim 1 wherein said isocyanate is characterized by having a minimum strength of at least 98.5% and the acidity is 0.005, by weight of the isocyanate.
3. The composition of claim 1 wherein said acid chloride is benzoyl chloride.
4. The composition of claim 1 wherein said acid chloride is hydrogen chloride.
5. A method of producing a polyurethane which comprises reacting a polyol with 4,4'-methylenebis(cyclohexyl isocyanate) in the presence of an acid chloride, said acid chloride being present in sufficient amount to give an acidity of 0.004 to 1.0%, by weight of said isocyanate.
6. The method of claim 5 wherein said isocyanate is characterized by having a minimum strength of at least 98.5% and the acidity of the isocyanate is 0.005 to 0.5%.
7. The method of claim 5 wherein said acid chloride is added to the isocyanate prior to reacting said isocyanate with the polyol.
8. The method of claim 5 wherein said acid chloride is hydrogen chloride.
9. The method of claim 5 wherein said acid chloride is benzoyl chloride.

References Cited

UNITED STATES PATENTS

| 2,692,873 | 10/1954 | Langerak et al. | 260—77.5 |
| 3,264,336 | 8/1966 | Powers | 260—453 |
| 3,351,650 | 11/1967 | Martin et al. | 260—453 |

OTHER REFERENCES

Vieweg et al., Polyurethanes, Carl Hanser Verlag (Munich) 1966, pp. 102–103.

DONALD E. CZAJA, Primary Examiner

H. S. COCKERAM, Assistant Examiner

U.S. Cl. X.R.
260—18, 75; 252—182